US011110400B2

(12) United States Patent
Shull et al.

(10) Patent No.: US 11,110,400 B2
(45) Date of Patent: Sep. 7, 2021

(54) POROUS POLYELECTROLYTE COMPLEX FILMS AND FOAMS AND RELATED METHODS

(71) Applicant: Northwestern University, Evanston, IL (US)

(72) Inventors: Kenneth R. Shull, Evanston, IL (US); Kazi Sadman, Evanston, IL (US); Qifeng Wang, Evanston, IL (US)

(73) Assignee: Northwestern University, Evanston, IL (US)

( * ) Notice: Subject to any disclaimer, the term of this patent is extended or adjusted under 35 U.S.C. 154(b) by 28 days.

(21) Appl. No.: 16/611,347

(22) PCT Filed: May 9, 2018

(86) PCT No.: PCT/US2018/031778
§ 371 (c)(1),
(2) Date: Nov. 6, 2019

(87) PCT Pub. No.: WO2018/208902
PCT Pub. Date: Nov. 15, 2018

(65) Prior Publication Data
US 2020/0164317 A1 May 28, 2020

Related U.S. Application Data

(60) Provisional application No. 62/504,171, filed on May 10, 2017.

(51) Int. Cl.
*B01D 67/00* (2006.01)
*B01D 69/02* (2006.01)
(Continued)

(52) U.S. Cl.
CPC ...... *B01D 67/0011* (2013.01); *B01D 67/0023* (2013.01); *B01D 69/02* (2013.01);
(Continued)

(58) Field of Classification Search
CPC ............ B01D 67/0011; B01D 67/0023; B01D 69/02; B01D 71/28; B01D 61/027;
(Continued)

(56) References Cited

U.S. PATENT DOCUMENTS

3,647,521 A * 3/1972 Tulin ..................... B01D 71/12
427/238
4,797,187 A * 1/1989 Davis ..................... B01D 71/46
427/58

(Continued)

FOREIGN PATENT DOCUMENTS

WO WO 1999/040996 A1 8/1999

OTHER PUBLICATIONS

Haile et al, Macromol. rapid commun. 2017, 38, 1600594.*
(Continued)

*Primary Examiner* — Krishnan S Menon
(74) *Attorney, Agent, or Firm* — Bell & Manning LLC

(57) ABSTRACT

Methods for making porous polyelectrolyte complex (PEC) films are provided. In an embodiment, such a method comprises coating the surface of a substrate with a polyelectrolyte (PE) coacervate mixture, the PE coacervate mixture comprising a cationic polymer, an anionic polymer, water, and a salt, the PE coacervate having a salt concentration; exposing the coating to an aqueous medium having another salt concentration, for a time to induce solidification of polyelectrolyte complexes (PECs) in the form of a PEC film having pores distributed throughout, wherein a difference Δ?C-M #191 between the salt concentration of the PE coacervate mixture and the salt concentration of the aqueous medium is selected to achieve a predetermined porosity for the porous PEC film.

19 Claims, 11 Drawing Sheets

(51) Int. Cl.
*B01D 71/28* (2006.01)
*B05D 1/28* (2006.01)
*B05D 1/36* (2006.01)
*B01D 61/02* (2006.01)
*B01D 61/14* (2006.01)

(52) U.S. Cl.
CPC ............... *B01D 71/28* (2013.01); *B05D 1/28* (2013.01); *B05D 1/36* (2013.01); *B01D 61/027* (2013.01); *B01D 61/145* (2013.01); *B01D 61/147* (2013.01); *B01D 2325/02* (2013.01); *B01D 2325/18* (2013.01)

(58) Field of Classification Search
CPC ................ B01D 61/145; B01D 61/147; B01D 2325/02; B01D 2325/18; B01D 61/02; B01D 61/14; B05D 1/28; B05D 1/36; B32B 27/00
See application file for complete search history.

(56) References Cited

U.S. PATENT DOCUMENTS

| | | | | |
|---|---|---|---|---|
| 4,941,972 A * | 7/1990 | Kau | .................... | B01D 69/125 210/490 |
| 2004/0044100 A1 * | 3/2004 | Schlenoff | ................ | C07B 57/00 523/206 |
| 2009/0324910 A1 | 12/2009 | Gemici et al. | | |
| 2010/0136238 A1 * | 6/2010 | Hayakawa | ............ | B01D 65/08 427/337 |
| 2012/0128739 A1 | 5/2012 | Nygaard et al. | | |
| 2012/0273409 A1 | 11/2012 | Seo et al. | | |
| 2015/0104484 A1 | 4/2015 | Schlenoff et al. | | |
| 2016/0144328 A1 | 5/2016 | Schlenoff et al. | | |
| 2016/0158707 A1 | 6/2016 | Heijnen et al. | | |

OTHER PUBLICATIONS

Wang et al, Macromolecules, 1999, 32, 7128-7134.*
Wang et al., "The polyelectrolyte complex/coacervate continuum." *Macromolecules* 47.9 (2014): 3108-3116.
Buriuli et al., "Polyelectrolyte complexes (PECs) for biomedical applications." *Advances in Biomaterials for Biomedical Applications*. Springer, Singapore, 2017. 45-93.
Kelly et al., "Spin-coated polyelectrolyte coacervate films." *ACS applied materials & interfaces* 7.25 (2015): 13980-13986.
The International Search Report and Written Opinion issued in International application No. PCT/US2018/031778 dated Jul. 11, 2018, pp. 1-10.
Hilal et al. "Characterization and retention of NF membranes using PEG, HS and polyelectrolytes." *Desalination* 221.1-3 (2008): 284-293.
Sadman et al. "Influence of hydrophobicity on polyelectrolyte complexation." *Macromolecules* 50.23 (2017): 9417-9426.

* cited by examiner

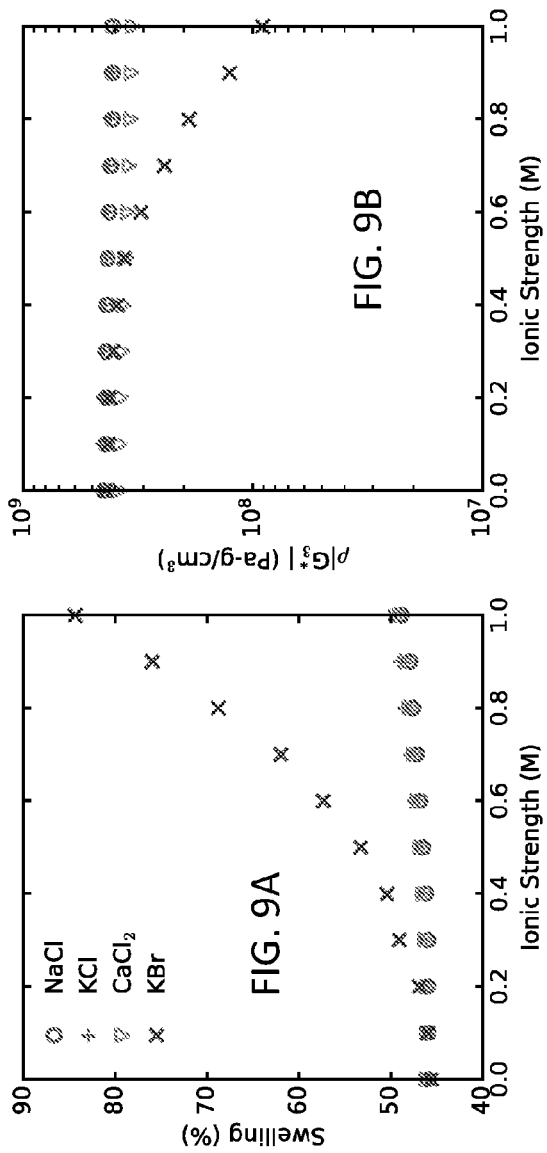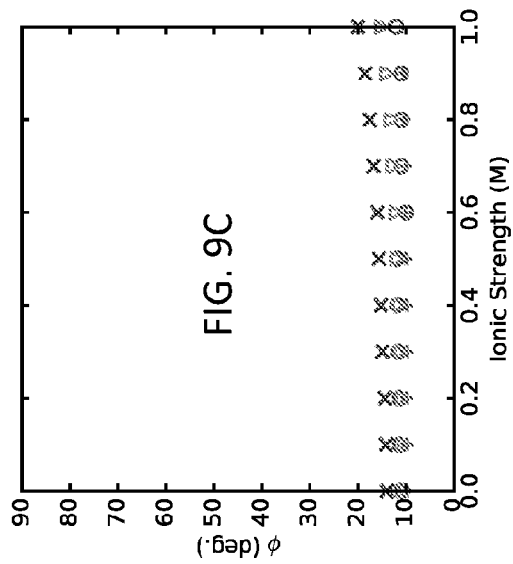
FIG. 9A
FIG. 9B
FIG. 9C

POROUS POLYELECTROLYTE COMPLEX FILMS AND FOAMS AND RELATED METHODS

CROSS-REFERENCE TO RELATED APPLICATIONS

This application is a National Stage of International Application No. PCT/US2018/031778, filed May 9, 2018, the contents of which are incorporated herein by reference, which claims the benefit of U.S. Patent Application No. 62/504,171, filed May 10, 2017, the contents of which are incorporated herein by reference.

REFERENCE TO GOVERNMENT RIGHTS

This invention was made with government support under DMR1410968 awarded by the National Science Foundation. The government has certain rights in the invention.

BACKGROUND

Due to their flexibility in morphology, controllable properties and low cost, polymer films are used as filtration membranes in a diverse set of applications, such as in gas separation, reverse osmosis and nano-, ultra-, and microfiltration. However, their application is limited due to their poor stability in organic solvents. The most organic solvent resistant materials are polytetrafluoroethylene (PTFE) and carbon. However, membranes made from these materials are difficult to prepare and expensive. Another concern is replacement cost when fouling becomes serious and the membrane loses its function. Polymer foams are used in thousands of everyday applications and consumer products, with polyurethane foams being the most common. Such foams are highly porous and can be shaped into a variety of different forms.

SUMMARY

Provided are methods for making porous polyelectrolyte complex (PEC) films and foams; the porous PEC films and foams themselves; and methods for using the porous PEC films and foams. The processes described herein eliminate the need for organic solvents and/or heat typically used in polymer membrane synthesis techniques, providing an overall greener process.

In one aspect, methods for making porous polyelectrolyte complex (PEC) films are provided. In an embodiment, such a method comprises coating the surface of a substrate with a polyelectrolyte (PE) coacervate mixture, the PE coacervate mixture comprising a cationic polymer, an anionic polymer, water, and a salt, the PE coacervate having a salt concentration; exposing the coating to an aqueous medium having another salt concentration, for a time to induce solidification of polyelectrolyte complexes (PECs) in the form of a PEC film having pores distributed throughout, wherein a difference $\Delta_{C-M}$ between the salt concentration of the PE coacervate mixture and the salt concentration of the aqueous medium is selected to achieve a predetermined porosity for the porous PEC film.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 9A shows swelling, FIG. 9B shows modulus and FIG. 9C shows viscoelastic phase angle of PSS:QVP-C2 as a function of solution ionic strength. The material is stable in all common salts found in sea water, showing little additional swelling as the ionic strength is raised.

DETAILED DESCRIPTION

Figure 1A:
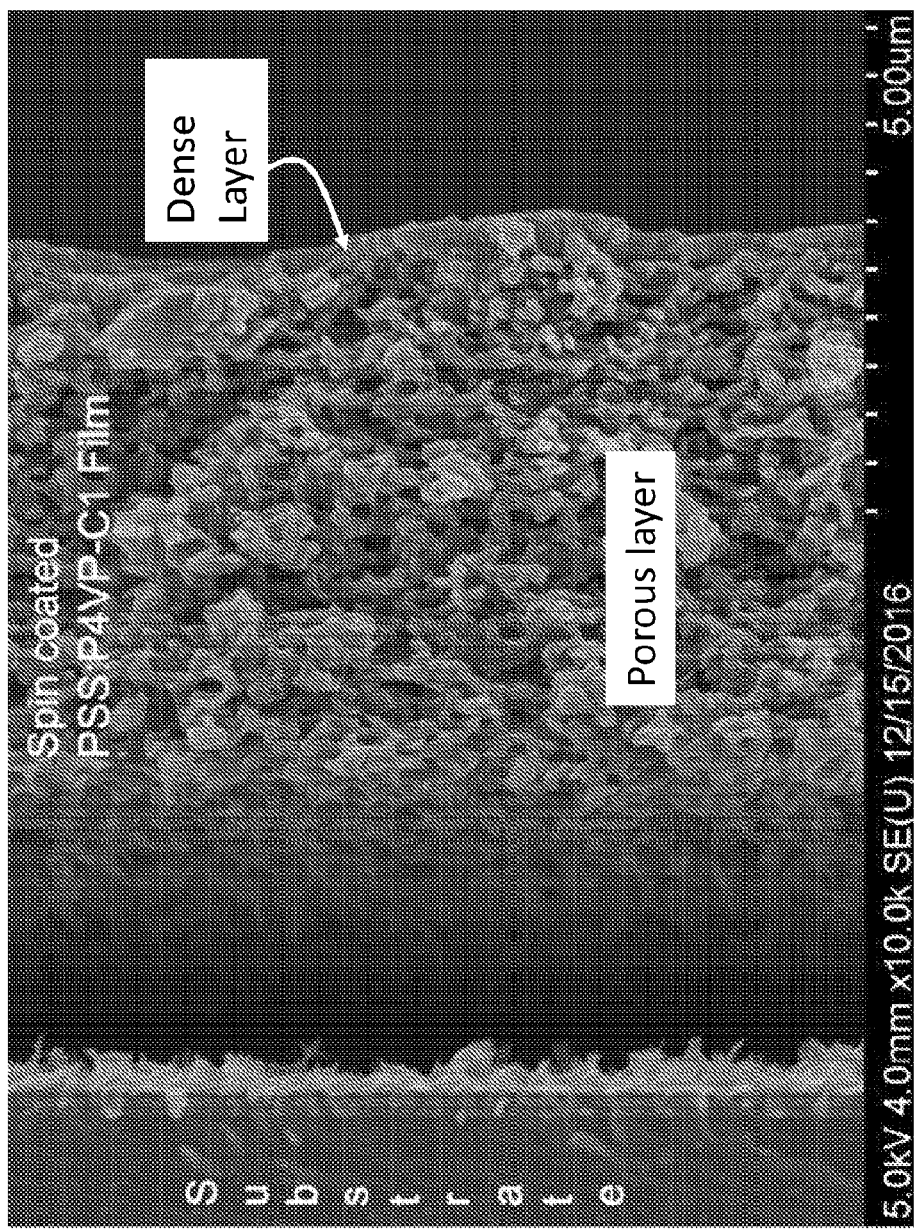
FIG. 1A is a scanning electron microscopy (SEM) image of a cross-section of a porous polyelectrolyte complex (PEC) film composed of poly(styrene sulfonate)/poly(N-methyl 4-pyridinium) according to an illustrative embodiment.

Provided are methods for making porous polyelectrolyte complex (PEC) films and foams; the porous PEC films and foams themselves; and methods for using the porous PEC films and foams. The term "membrane" may also be used in place of "film," as in "porous PEC membranes." Rather than making use of heat and/or organic solvents as used in the formation of polymer membranes using conventional methods, the present methods involve manipulation of the phase behavior of polyelectrolyte systems (comprising cationic and anionic polymers, water and salt) in order to achieve porosity in PEC films from polyelectrolyte (PE) coacervate mixtures.

In one aspect, methods for making porous polyelectrolyte complex (PEC) films are provided. Such a method may comprise as a first step, coating the surface of a substrate with a polyelectrolyte (PE) coacervate mixture, the PE coacervate mixture comprising a cationic polymer, an anionic polymer, water, and a salt. The relative amounts of the cationic polymer, anionic polymer, water and salt are selected to facilitate formation of a coacervate mixture. The PE coacervate mixture which is coated onto the surface may be characterized by its salt concentration. The specific initial salt concentration depends, in part, upon the choice of cationic polymer, anionic polymer and salt. By "coacervate mixture" it is meant a phase-separated solution mixture comprising at least two phases, one rich and one poor in the cationic and anionic polymers. The "coacervate phase" is the polymer rich phase used for membrane and foam synthesis. The Example below describes an illustrative method for preparing PE coacervate mixtures from illustrative PECs, as well as for preparing the PECs themselves.

A variety of cationic and anionic polymers may be used in the PE coacervate mixture, depending upon the desired application. The cationic and anionic polymers may be synthetic or natural. Illustrative cationic polymers include poly(allylamine), poly(ethyleneimine), Chitosan, poly(N-alkyl 4-vinyl pyridinium), poly(N-alkyl 2-vinyl pyridinium), poly(diallyldimethylammonium), poly([2-(Acryloyloxy) ethyl]trimethylammonium) Poly(N,N-dimethyl-3,5-dimethylene piperidinium chloride), poly(vinylbenzyltrimethylammonium chloride), and polyvinylamine. Illustrative anionic polymers include poly(acrylic acid), poly(methacrylic) acid, Agar, Alginate, Hyaluronic Acid, poly(styrene sulfonate), poly(phosphate) poly(vinylsulfonic acid), and poly(acrylamido-2-methylpropanesulfonate). In embodiments, the cationic and/or anionic polymers may be selected so that PECs formed therefrom exhibit a desired hydrophobicity. For example, by tuning hydrophobicity, PECs can be formed which exhibit little to no swelling in common salts (e.g., NaCl, KCl, $CaCl_2$)). At the same time, PECs can be formed which may be dissolved by other salts (e.g., KBr) which are used in the present methods to achieve porous PEC films. This is illustrated in FIGS. 9A-C, for poly(styrene sulfonate) (PSS, anionic polymer) and poly(N-ethyl-4-vinylpyridiunum) (QVP-C2, cationic polymer). In the presence of common ions such as those of seawater, sodium, chlorine, calcium and potassium, PSS:QVP-C2 shows very little additional swelling.

A variety of salts may be used in the PE coacervate mixture, depending upon the choice of cationic and anionic polymers and on the desired doping constant. Illustrative salts include potassium bromide, sodium chloride, potassium chloride, sodium bromide, sodium thiocyanate, guanidinium bromide, and guanidinium thiocyanate.

Other additives may be included in the PE coacervate mixture to tune the mechanical or chemical properties of the porous PEC film. Such additives include inorganic particles (e.g., silica powder or laponite).

A variety of thin film deposition techniques may be used to coat the surface of the substrate with the PE coacervate mixture. Illustrative techniques include spin coating, spray coating, blade casting, roll casting and dip coating. Such techniques are capable of providing a substantially uniform, thin film of the PE coacervate mixture on the surface of the substrate. In embodiments, blade casting or roll casting is used since these are readily amenable to high-throughput processing. In addition, roll casting is useful to reduce or eliminate evaporation of water from the coatings prior to carrying out subsequent steps of the method. If spin coating is used, the spin coating time is generally minimized to reduce or eliminate evaporation. A variety of substrates may also be used in the present methods.

In a subsequent step of the present methods, the PE coacervate coating is exposed to an aqueous medium. The phrase "aqueous medium" encompasses the use of both pure water and aqueous salt solutions. However, if an aqueous salt solution is used, its salt concentration will be less than that of the PE coacervate mixture. Illustrative salt concentrations for the aqueous medium include zero (i.e., pure water) or those of no greater than about 1.0 M, no greater than about 0.75 M, or no greater than about 0.5 M. Exposure to the aqueous medium for an appropriate period of time effectively reduces the salt concentration in the PE coacervate coating, inducing complexation between the cationic polymer and the anionic polymer to form strongly bound polyelectrolyte complexes (PECs) and precipitation of the PECs into a solid, yet porous, matrix with a coexisting water phase. As further described below, the difference in the salt concentrations of the PE coacervate mixture and the aqueous medium, is used to tune the porosity of this matrix. This difference may be referred to as $\Delta_{C-M}$ (C denotes the PE coacervate, A denotes the aqueous medium). As noted above, the exposure is carried out (e.g., by immersion in the aqueous medium) for a period of time to remove a sufficient amount of salt from the PE coacervate coating in order to achieve the desired porosity. If the time is not long enough, too much salt will remain and pores will ultimately collapse resulting in a continuous solid PEC structure (no pores). The period of time may be that which maximizes the removal of the salt, including complete removal of the salt. In embodiments, the period of time is at least 30 minutes. However, the period of time may be at least 60 minutes, at least 120 minutes, at least 3 hours, at least 5 hours, or in the range of 30 minutes to 7 hours. Exposure to the aqueous medium may occur prior to any drying of the PE coacervate coating since drying affects the salt concentration in the PE coacervate coating.

Figure 3:
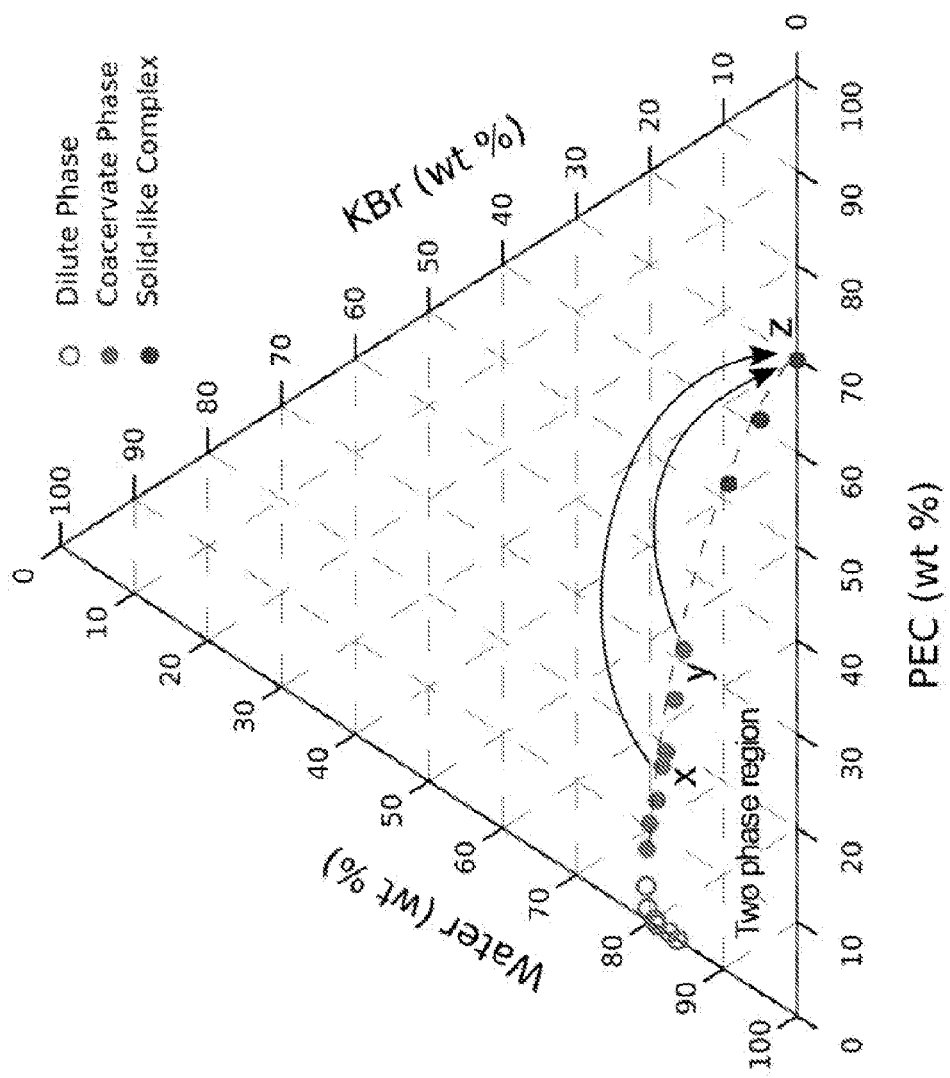
FIG. 3 shows the measured phase behavior of poly(styrene sulfonate) (PSS, anionic polymer), poly(N-ethyl-4-vinylpyridiunum) (QVP-C2, cationic polymer), and a salt (KBr). Point X corresponds to a polyelectrolyte (PE) coacervate mixture having a salt concentration of 17.3% and point Y corresponds to a PE coacervate mixture having a salt concentration of 15.2%.
Figures 4A, 4B:
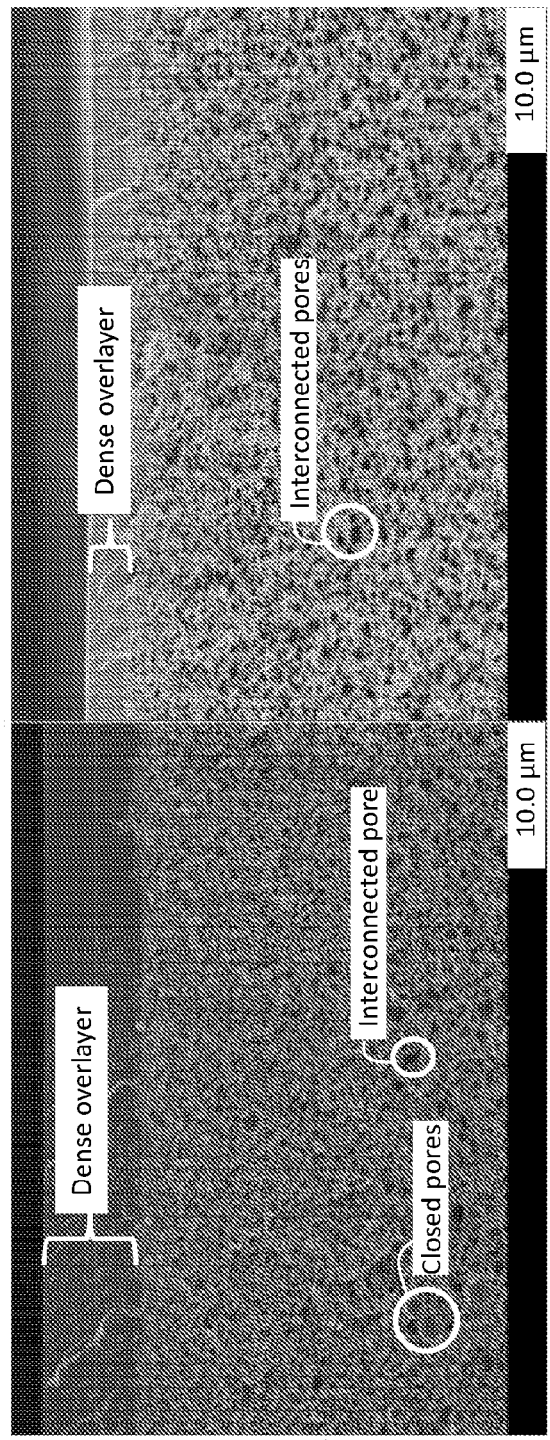
FIG. 4A is a SEM image of a cross-section of a porous PEC film formed from the PE coacervate mixture of point Y in FIG. 3.
FIG. 4B is a SEM image of a cross-section of a porous PEC film formed from the PE coacervate mixture of point X in FIG. 3.

The present disclosure is based, in part, on the inventors' findings that the phase behavior of polyelectrolyte systems can be manipulated in order to achieve pores in PEC films from PE coacervate mixtures, as well as to achieve a desired porosity. By way of illustration, FIG. 3 shows the phase behavior of an illustrative polyelectrolyte system based on the anionic polymer PSS, the cationic polymer QVP-C2, and the salt KBr. As described in the Examples below, PE coacervate mixtures having different salt concentrations can be used to form different PE coacervate coatings. These PE coacervate coatings, can be exposed to an aqueous medium having another, different salt concentration, for a sufficient period of time to induce solidification of PECs in the form of porous PEC films, each porous PEC film having a different porosity. Specifically, point "X" in FIG. 3 identifies one PE coacervate mixture having a salt concentration of about 17% by weight. Point "Y" in FIG. 3 identifies another PE coacervate mixture having a salt concentration of about 15% by weight. Individual coatings formed from each PE coacervate mixture can be subsequently immersed in pure water (salt concentration ~0) for a sufficient period of time to induce a liquid-to-solid phase transformation to point "Z" in FIG. 3. FIGS. 4A and 4B, which show SEM images of cross-sections of the resulting porous PEC films, demonstrates that the porous PEC film formed from point Y (lower salt concentration) has a lower porosity as compared to point X (higher salt concentration). Other porous PEC films may be formed having different porosities by adjusting the difference between the salt concentrations of the PE coacervate mixture and the aqueous medium.

The images of FIGS. 4A, 4B also illustrate the pore morphology of the present porous PEC films. The pores of the porous PEC films are distributed uniformly throughout the film. Although pore cross-sections may be characterized as being approximately circular, in three-dimensions, at least some of the pores of the porous PEC films may be better characterized as being in the form of elongated, tortuous channels distributed throughout the porous PEC film. Nevertheless, pore dimensions may be determined from cross-section SEM images and the pores may be characterized by their diameter. The diameter may be taken as the maximum distance across opposing sides of a pore as determined from such a cross-sectional SEM image. The diameter may be reported as an average value as determined from a representative population of pores. The average diameter may be in the range of from about 1 nm to about 1 µm, about 10 nm to about 750 nm, about 100 nm to about 500 nm, about 100 nm to about 1 µm, about 300 nm to 3 µm. These diameters are substantially smaller than the pores of porous PEC films formed using other methods (e.g., layer-by-layer methods). The porosity of the present porous PEC films may be in the range of from 10% to 90%. In embodiments, the porosity is in the range of from 10% to 80%, from 10% to 70%, from 10% to 60%, from 20% to 60%, from 30% to 60%, or from 60% to 90%. Porosity may be measured using mercury intrusion porosimetry.

SEM images such as those shown in FIG. 4A also reveal that at least some embodiments of the present porous PEC films have two types of pores, interconnected pores and closed pores (some of both types are labeled in the figure). Interconnected pores are pores which are connected to other pores in the porous PEC film, including as being in the form of elongated, tortuous channels. Interconnected pores are useful as they are capable of transporting a liquid throughout the porous PEC film. Closed pores are egg-like or cup-like features that can hold a liquid but are not connected to other pores and thus, have a more limited ability to transport liquid through the porous PEC film. The relative amounts of interconnected pores and closed pores may also be tuned by adjusting the difference between the salt concentrations of the PE coacervate mixture and the aqueous medium. In general, lower salt concentrations in the PE coacervate mixture will provide a greater fraction of closed pores, while higher salt concentrations will provide a greater fraction of interconnected pores. In embodiments, a majority of the pores are interconnected pores (e.g., see FIG. 4B).

Figure 4C:
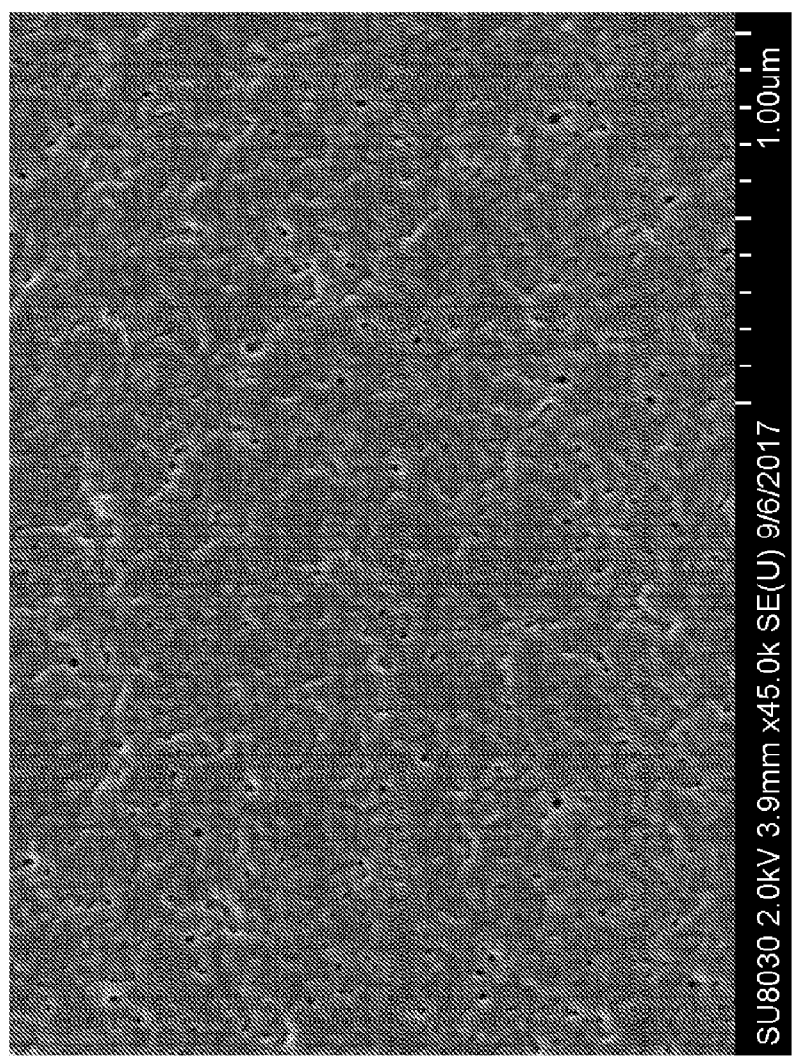
FIG. 4C is a SEM image of the surface of the porous PEC film of FIG. 4B.

The SEM images also show that at least some embodiments of the present porous PEC films are composed of distinct sublayers. Each sublayer may be characterized by a different average pore diameter. In the embodiments of FIGS. 4A and 4B, the overlayer (labeled "dense layer") includes pores, although the pores have an average diameter which is smaller than the average diameter of the pores in the underlayer (labeled "porous layer"). By way of illustration, the average pore diameter of the overlayer may be on the order of several nanometers while the average pore diameter of the underlayer may be within the ranges described above, e.g., 300 nm to 3 µm. FIG. 4C is an SEM image of the surface of the porous PEC film of FIG. 4A, showing another view of the dense overlayer at the surface of the porous PEC film. Again, the presence of the overlayer can be controlled via the difference between the salt concentrations of the PE coacervate mixture and the aqueous medium. By way of illustration, the salt concentration of the PE coacervate mixture can be increased to inhibit and prevent the formation of the dense overlayer.

The inventors' findings described above may be used to facilitate the formation of porous PEC films having predetermined porosities. A "predetermined" value refers to a desired value to be obtained as determined prior to formation of the PEC film. By way of illustration, if a porous PEC film having a porosity of 52% is desired, a PE coacervate mixture and an aqueous medium can be prepared, each at the appropriate salt concentration to achieve such a porous PEC film. To further facilitate formation of porous PEC films having predetermined porosities, calibration plots relating the difference in salt concentrations, i.e., $\Delta_{C-M}$ to porosity may be generated for a selected polyelectrolyte system comprising a selected cationic polymer, a selected anionic polymer and a selected salt. To generate the calibration plot, a number of PE coacervate mixtures having different salt concentrations may be prepared, coated onto a surface of a substrate, and converted to porous PEC films as described above using pure water as the aqueous medium. The $\Delta_{C-M}$ (in this case, each difference equals the salt concentration of the respective PE coacervate mixture) can be calculated and the porosity of each porous PEC film can be measured. The resulting values of $\Delta_{C-M}$ and porosity may be plotted and if desired, a curve fit to the data. Given any predetermined porosity value, the calibration plot may be used to determine what $\Delta_{C-M}$ should be used in the method in order to form the porous PEC film. Different polyelectrolyte systems will have different ranges of $\Delta_{C-M}$ and different associated ranges of porosities.

After formation of the porous PEC film, the film coating generally remains hydrated. The water content will depend upon the selected cationic and anionic polymers, but, e.g., the water content of a porous PEC film formed from the PSS:QVP-C2 system shown in FIG. 3 would be about 45% by weight. In a subsequent step of the present methods, the water may be removed from the porous PEC film. Various techniques may be used to remove the water, including rapid drying using a nitrogen air gun. However, in the present methods, the porous PEC films remain porous and can retain their pore morphology upon drying.

The porous PEC films, whether in hydrated or dry form, may then be removed from their underlying substrates.

Figure 1B:
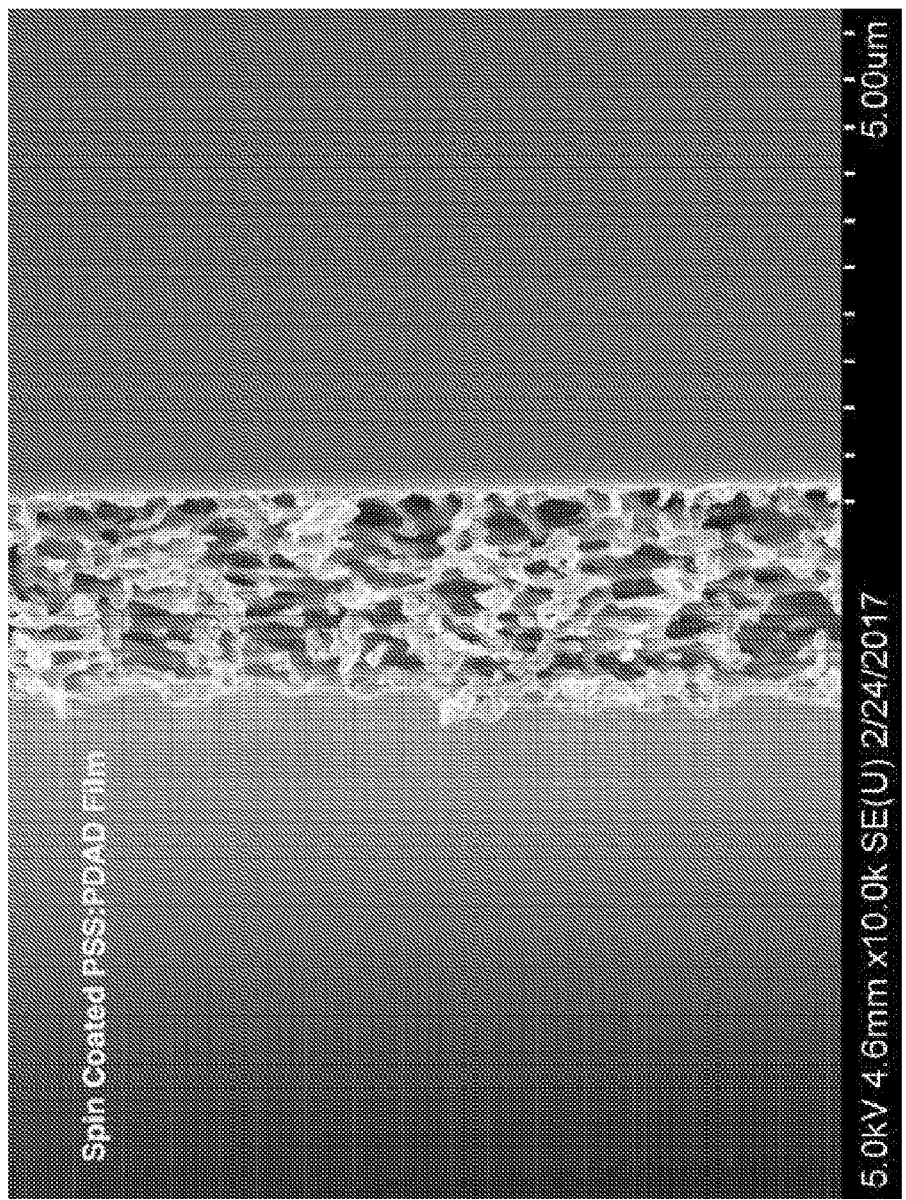
FIG. 1B is a SEM image of a cross-section of a porous PEC film composed of poly(styrene sulfonate)/poly(diallyldimethylammonium) according to an illustrative embodiment.

Other illustrative porous PEC films formed using the present methods (using rapid drying with a nitrogen air gun) are shown in FIGS. 1A and 1B.

The porous PEC films may be characterized by their overall thickness, which may be reported as an average value as determined from representative measurements across the surface of the film. The overall average thickness may be in the range from about 1 µm to about 300 µm. The term "overall" encompasses any sublayers of the porous PEC films, e.g., both the porous layer and a dense overlayer, if present. In the absence of the dense overlayer, the overall thickness refers to the thickness of the porous layer.

Although the average pore diameter and the porosity may be adjusted via salt concentration as described above, these parameters may also be tuned through the selection of the type of cationic and anionic polymer.

It is noted that the present methods may also be carried out using a polyelectrolyte complex solution in which the cationic and anionic polymers are fully dissolved in the salt solution, rather than using the PE coacervate mixture as described above. This may be useful to achieving very high porosities, e.g., in the range of from 60% to 90%.

In another aspect, methods for making porous polyelectrolyte complex (PEC) foams are also provided. In an embodiment, such a method comprises adding a foaming agent to a polyelectrolyte (PE) coacervate mixture, the PE coacervate mixture comprising a cationic polymer, an anionic polymer, water, and a salt and inducing the foaming agent to undergo a reaction to release a gas, thereby generating bubbles throughout the PE coacervate mixture, and thus, a foam.

Any of the PE coacervate mixtures described above may be used. A variety of foaming agents may be used, including (bi)carbonate salts. The term "(bi)carbonate" encompasses both carbonate and bicarbonate. Ammonium bicarbonate is an illustrative foaming agent. (Bi)carbonate salts may be induced to undergo a reaction to release carbon dioxide, including by the addition of an acid (e.g., HCl) to the PE coacervate mixture. The relative amount of foaming agent in the PE coacervate mixture as well of type of foaming agent may be selected to further tune the average pore diameter and porosity in the foam.

The PE coacervate mixture may include additives such as surfactants to reduce the surface tension of the PE coacervate mixture and facilitate foam formation. Other additives may be included to tune the mechanical or chemical properties of the porous PEC foam. Such additives include inorganic particles (e.g., silica powder).

The foaming methods may include additional steps such as solidifying the foam and extracting the salt from the solidified foam. Solidifying the foam may be accomplished by exposing the foam to liquid nitrogen or other similar techniques. Extracting the salt from the solidified foam may be accomplished by exposing the solidified foam to water or an aqueous solution (e.g., aqueous salt solutions having an ionic strength lower than that of the PE coacervate mixture). Salt extraction enhances the degree of complexation between the cationic and anionic polymers. As the degree of complexation increases, so does the rigidity and the overall mechanical stability. The solidified foam may be freeze dried prior to exposure to water/aqueous solution.

The porous PEC foam may assume a variety of shapes depending upon the container or mold used to hold the PE coacervate mixture during the foaming process. However, the porous PEC foams may be subjected to post-processing such as cutting, etc., to form other shapes such as slabs, discs, films, etc.

An illustrative porous PEC foam formed using the foaming methods described above is shown in FIG. 2. The image shows that the pores of the porous PEC foams are fairly regularly shaped and are spherical (circular cross-sections). The pores may be characterized by their diameter as determined from a cross-sectional image (e.g., such as those shown in FIG. 2). The diameter may be reported as an average value as determined from a representative population of pores. The average diameter may be in the range of from about 100 nm to about several microns. The porosity of the porous PEC foams may be in the range of from about 10% to about 90%. The image also shows two types of pores in the illustrative porous PEC foam, interconnected pores and closed pores. The arrows indicate the interconnected pores, i.e., pores which are connected to other pores in the porous PEC foam. Such pores may be in the form of elongated, tortuous channels. Interconnected pores are useful as they are capable of transporting a liquid throughout the porous PEC foam. The egg-shaped, cup-like features are also pores, but they are generally closed, i.e., not connected to other pores. The parameters of the foaming method described above may be adjusted to achieve a desired ratio of interconnected pores to closed pores, e.g., to maximize the ratio.

In each either of the film-forming methods or foam-forming methods described above, the cationic and/or anionic polymers used to form the PE coacervate mixture may be block copolymers. Electrostatic complexation can be induced by introducing another type of cationic polymer and following the remaining steps of the methods described above. The additional components of the cationic or anionic block copolymer can impart other properties on the final porous PEC film or foam. As an illustrative example, Poly (methyl methacrylate)-poly (methacrylic acid)-poly (methyl methacrylate) [PMMA-PMAA-PMMA] triblock copolymer can self-assemble into well-defined elastic hydrogels by forming crosslinked PMMA micelle cores with PMAA bridges. An additional cationic polymer (or anionic polymer or both) may be added to the PE coacervate mixture, e.g., quaternized poly (4-vinylpyridine). The subsequently formed porous PEC film or foam is structurally enhanced by the addition of crosslinking micelles because of the double network crosslinking, micellular crosslinking and electrostatic crosslinking.

The porous PEC films and foams may be used in a variety of applications. An illustrative application is filtration, including water purification and organic solvent purification. Thus, the porous PEC films and foams may be used in methods involving passing a raw liquid (e.g., water, organic solvent, aqueous solution, organic solution, etc.) through any of the disclosed films/foams to provide a purified liquid. The porous PEC films and foams may be incorporated into a variety of conventional systems for water/organic solvent purification. As illustrated in the Examples below, by contrast to most polymer membranes, embodiments of the porous PEC films are stable in a variety of organic solvents. This is due, at least in part, to their electrostatic crosslinks and high density of hydrophilic charged groups.

Figure 5:
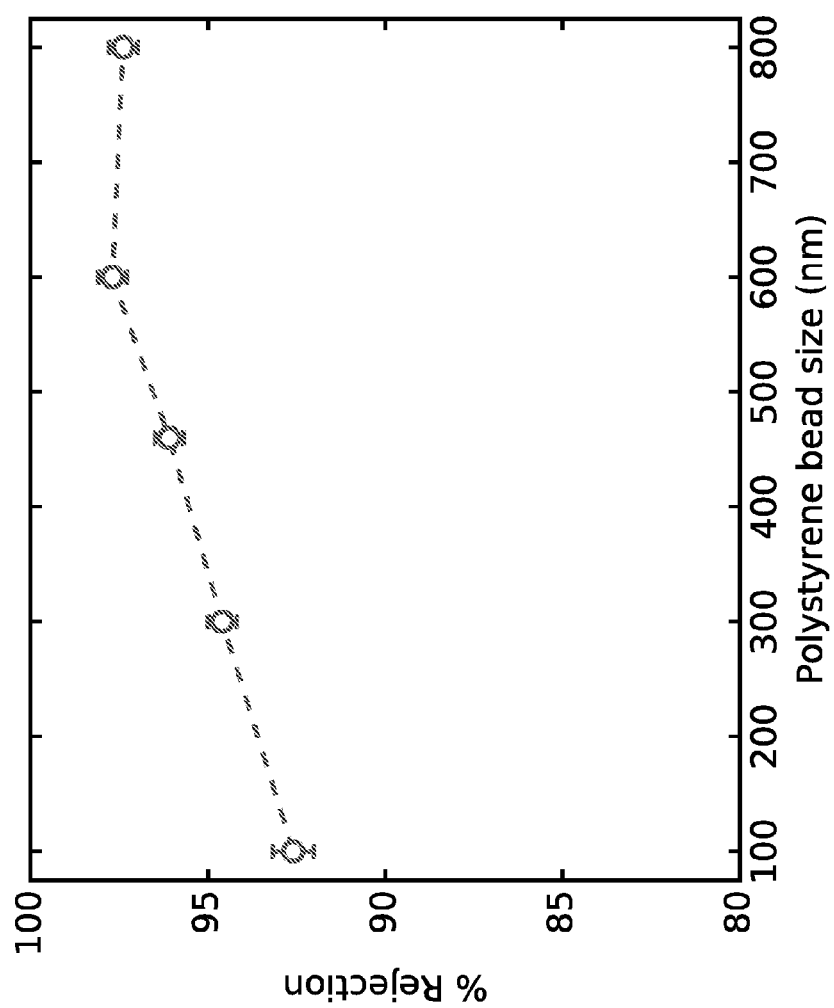
FIG. 5 is a plot of the rejection of polystyrene beads from the porous PEC film of FIG. 4B as a function of polystyrene bead size.
Figure 6:
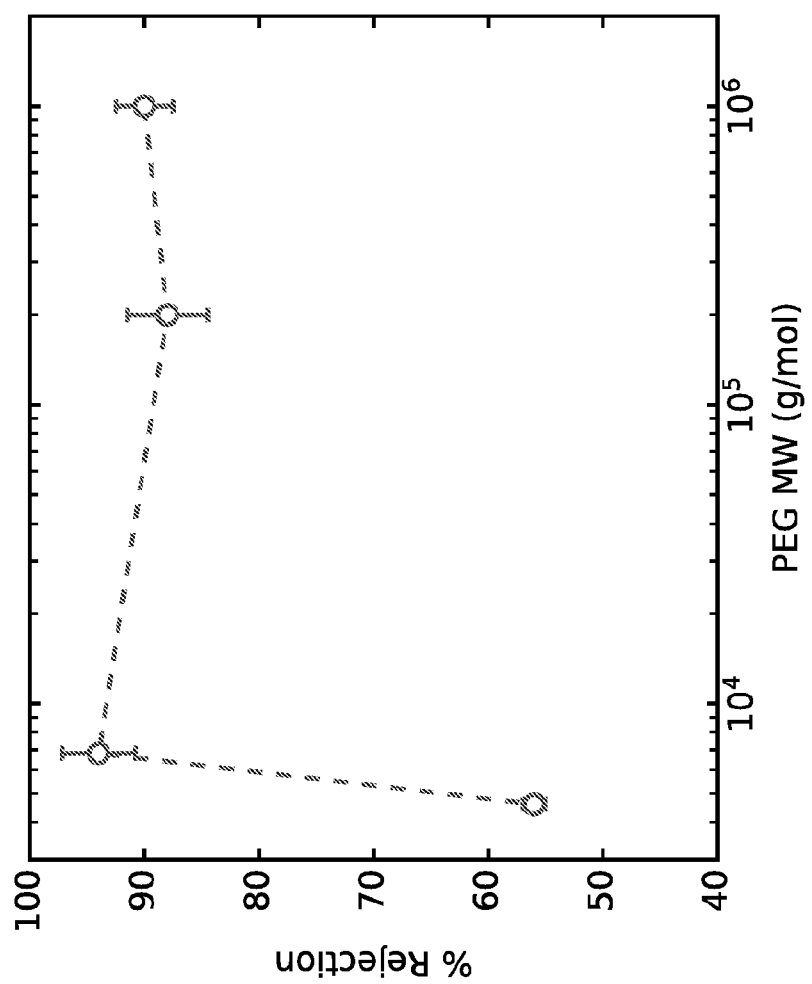
FIG. 6 is a plot of the rejection of polyethylene glycol (PEG) molecules from the porous PEC film of FIG. 4B as a function of PEG molecular weight.

Filtration applications are illustrated in FIGS. 5 and 6. FIG. 5 shows the percentage of polystyrene beads blocked from passing through a porous PEC film formed according to the present methods as a function of the size (diameter) of the polystyrene beads. Thus, the present porous PEC films may also be characterized by their ability to reject polystyrene beads of a predetermined size as this is related to the porosity of the porous PEC films. In embodiments, the porous PEC film is capable of rejecting at least 90% of polystyrene beads having a diameter of at least 100 nm. FIG. 6 shows the percentage of polyethylene glycol (PEG) macromolecules blocked from passing through a porous PEC film formed according to the present methods as a function of the size (molecular weight) of the PEGs. Thus, the present porous PEC films may also be characterized by their ability to reject PEGs of a predetermined size as this is related to the porosity of the porous PEC films. In embodiments, the porous PEC film is capable of rejecting at least 90% of PEGs having a molecular weight of at least $10^4$ g/mol. Each of these characteristics may also apply to the porous PEC foams described herein.

The porous PEC films and foams may also be used in nano-, ultra-, and microfiltration. By way of illustration, porous PEC films comprising a porous layer and a dense overlayer, each having a distinct average pore diameter, greatly increases the flux through the film, which is useful for ultrafiltration applications.

Both the porous PEC films and foams may be further functionalized post-processing, e.g., by depositing additional material layer(s) on/over the surface of the films/foams. By way of illustration, a layer of a polymer (e.g., hydrophobic or hydrophilic) may be deposited on the surface of the porous PEC films and foams. A monolayer of Nafion may used to render the functionalized film/foam superhydrophobic and capable of separating/filtering oil-water mixtures. (See FIG. 8.) As another example, a layer of a pH responsive agent may be deposited, which may then be removed by flowing acidic or basic water through the porous PEC films/foams.

Due to the chemical nature of the porous PEC films and foams, they may be dissolved by using concentrated salt solutions. This is useful upon fouling. Specifically, the porous PEC films or foams may be exposed to an aqueous salt solution having an ionic strength sufficient to dissolve the polyelectrolyte complex. Then, the porous PEC film or foam may be regenerated using the steps of the methods described above. As an initial step, the composition of the aqueous salt solution may be adjusted to either completely or partially dissolve the porous PEC film or foam. For example, the functionalized surface of the PEC film or foam may be tuned to dissolve at a certain lower salt concentration than that would dissolve the entire film/foam. This may be useful in regenerating the existing membrane surface. Alternatively, a higher salt concentration may be used to completely dissolve the entire porous PEC film or foam, which may subsequently be redeposited using the methods outlined above.

Example

A first set of experiments illustrating the formation of porous PEC films is first described.

Materials:

Poly(styrene sulfonate) sodium salt (PSS, MW 200K g $mol^{-1}$), poly(diallyldimethylammonium) chloride (PDADMA, MW 200-350K g $mol^{-1}$), poly(4-vinylpyridine) (P4VP, MW 60K g $mol^{-1}$) were purchased from Sigma Aldrich. Iodomethane, 1-bromoethane, 1-bromopropane and KBr were also purchased from Sigma-Aldrich. Deionized water (conductivity ≈ 5 µS/cm) was used for making all solutions except when forming coacervates where 18.2 M Ω cm MilliQ water was used.

Stoichiometric PECs:

PECs were made from poly(styrene sulfonate)/poly(N-methyl 4-pyridinium) (PSS:QVP) in a similar manner as previously reported. (See *Macromolecules* 50, 23, 9417-9426.) Once the quaternization reaction was completed (in DMSO), the moles of QVP repeat units were calculated, and the equivalent amount of PSS was dissolved in equivalent volume of water separately. The two solutions were then simultaneously added to a third beaker of water under stirring. The PECs again precipitated out as a white solid that was vacuum filtered and washed with deionized water. Since pyridines have poor thermal stability, these precipitates were dried at 700° C. and in the presence of drierite for 12 hours.

Coacervates:

Coacervates were formed from the dry PECs by dissolving them in solutions of KBr. In all cases, 1.50 g of dry PEC was dissolved in 10 g of ultra pure water and 2.75-3.25 grams of KBr. Once the PECs dissolved, an additional 5 g of water was added while keeping the solution well stirred. Once the coacervate phase began to form, the solution was annealed at 60° C. for 30 min. The solutions were then allowed to equilibrate between 24-48 hours, depending on the sample. Coacervates formed at lower salt concentrations required longer equilibration times.

Preparation of Porous Films:

Coacervate solutions were spin coated onto a substrate which was immediately immersed into either pure water or a low ionic strength KBr solution (~0.75 M). After 30 minutes of immersion, the substrate was taken out and the film dried rapidly using a nitrogen air gun. The rapid drying process yielded porous films as seen in FIGS. 1A, 1B.

The swelling and thus, the stability of the porous films were analyzed in a variety of organic solvents. The results are summarized in Table 1. The swelling measurement was done by observing the weight change of the porous film after immersion in the organic solvent of interest. The swelling may be considered to be a "% mass uptake" of the organic solvent. A swelling of 20% or lower indicates good stability in the organic solvent, although the acceptable magnitude of the swelling depends upon the application. The swelling may be further controlled by incorporating inert inorganic particles as described above.

TABLE 1

| Stability of polystyrene sulfonate)/poly(N-methyl 4-pyridinium) in organic solvents. | | |
|---|---|---|
| Solvent | Swelling % | Stability |
| Hexane | 1 | Good |
| Acetone | 5 | Good |
| Tetrahydrofuran | 10 | Good |
| Ethanol | 20 | Good |
| Methanol | 32 | Marginal |
| Chloroform | 40 | Marginal |
| Toluene | 23 | Marginal |
| Dimethylformamide | 34 | Marginal |

A second set of experiments illustrating the formation of porous PEC foams is described next.

Figure 2:
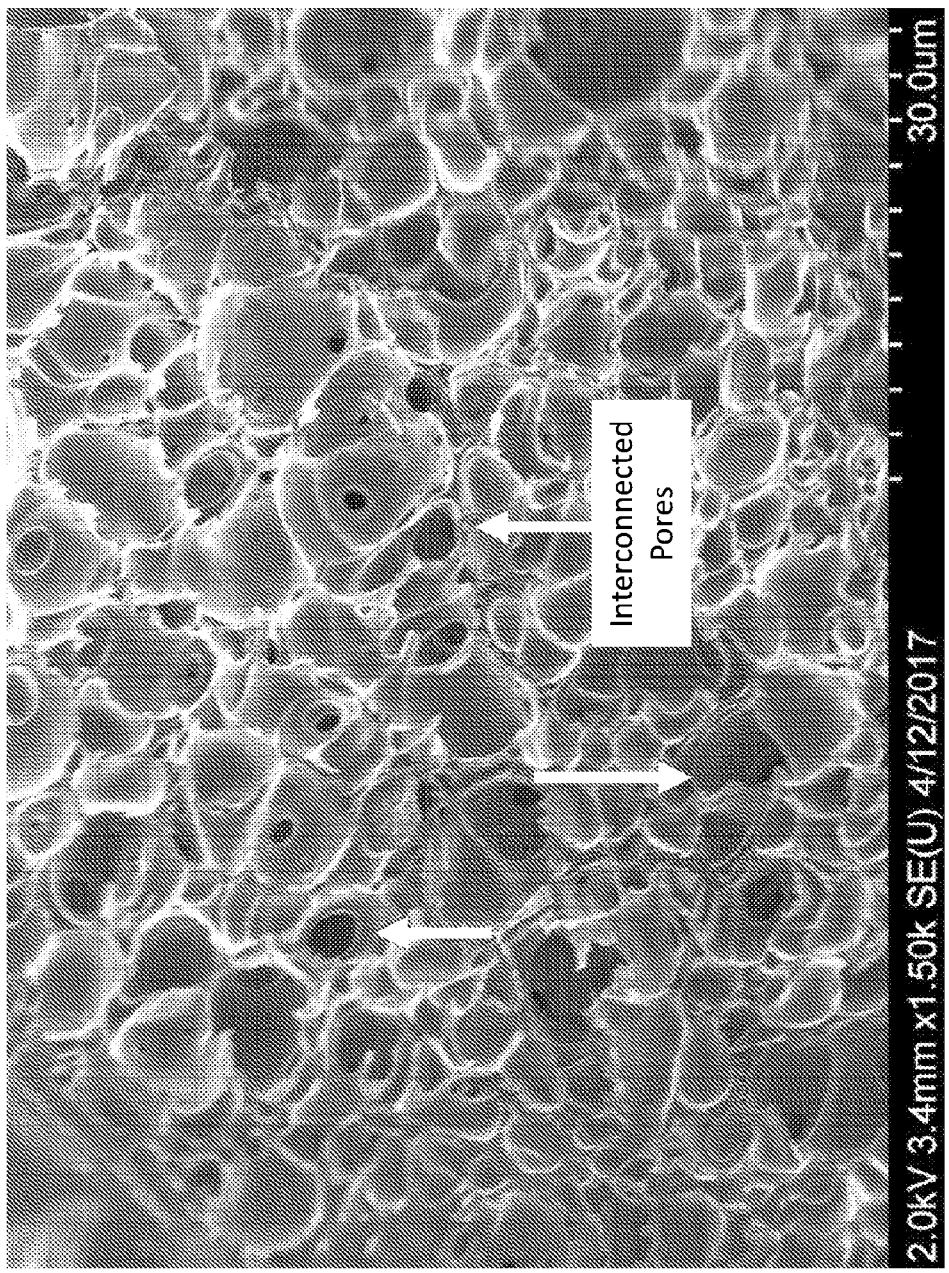
FIG. 2 is a SEM image of a cross-section of a porous PEC foam composed of poly(styrene sulfonate)/poly(N-methyl 4-pyridinium) according to an illustrative embodiment.

Preparation of Porous Foams:

Coacervate solutions were taken into a scintillation vial to which amounts of Tween 80 (surfactant) and ammonium bicarbonate (foaming agent) were added. In some cases, silica powder at 20-70 vol. % was added. Lastly, an aliquot of HCl was added and the mixture was stirred rapidly using a mechanical drill retrofitted with a Teflon spatula for 15 seconds. Once the foam began to rise, the vial was immersed into liquid nitrogen. This foam was subsequently immersed into pure water, or freeze dried and then immersed into pure water to obtain the final product. Immersion in water extracts the KBr from the foam, which locks in the porous structure. A porous foam is shown in FIG. 2.

A third set of experiments illustrating the formation of additional porous PEC films is described next.

Materials:

Poly(styrene sulfonate) sodium salt (PSS, MW 200K g $mol^{-1}$) was purchased from Sigma-Aldrich. poly(4-vinylpyridine) (P4VP, MW 50K g $mol^{-1}$) was purchased from Scientific Polymers. 1-bromoethane, NaCl, KCl, LiCl, $CaCl_2$ and KBr were also purchased from Sigma-Aldrich. Deionized water (conductivity ~5 µS/cm) was used for making all solutions except when forming coacervates where 18.2 M Ω*cm MilliQ water was used.

Quaternization of Poly(4-Vinylpyridine):

Methyl, ethyl and propyl substituted P4VP are referred to as QVP-C1, QVP-C2 and QVP-C3 respectively. QVPs were synthesized by dissolving 10 wt % P4VP in dimethyl sulfoxide before adding a molar excess of the methyl iodide, ethyl bromide or propyl bromide. QVP-C1 was synthesized by adding 20% molar excess of methyl iodide while keeping the solution well stirred for 4 hours at room temperature. QVP-C2 (QVP-C3) was synthesized by adding 70% (100%) molar excess of ethyl (propyl) bromide while keeping the solution well stirred for 24 hours at 40° C.

Stoichiometric PECs:

Once the quaternization reaction was completed (in DMSO), the moles of QVP repeat units were calculated, and the equivalent amount of PSS was dissolved in equivalent volume of water separately. The two solutions were then simultaneously added to a third beaker of water under stirring. The PECs again precipitated out as a white solid that was washed with deionized water until the solution conductivity fell to about 50 µS/cm. Since pyridines have poor thermal stability, these precipitates were dried at 70° C. and in the presence of drierite for 12 hours to obtain the dry PEC.

Coacervates:

Coacervates were formed from the dry PECs by dissolving them in solutions of KBr. In all cases, 1.50 g of dry PEC was dissolved in 10 g of MilliQ water (18.2 M varOmega cm) and 3.45 or 2.95 grams of KBr. Once the PECs dissolved, an additional 5 g of water was added while keeping the solution well stirred. This resulted in salt weight fractions of 15.2% (point Y in the phase diagram of FIG. 3) and 17.3% (point X in the phase diagram of FIG. 3). Once the coacervate phase began to form, the solution was annealed at 60° C. for 30 min. The solutions were then allowed to equilibrate between 1 week to 1 month, depending on the sample. Coacervates formed at lower salts required longer equilibration times.

Phase Behavior:

The phase behavior of PSS:QVP-C2 was measured using thermogravimetric and conductivity experiments. Since PECs are a three-component system of water, salt and polymer, only the fraction of two components need to be known to calculate the phase diagram. The water content of the complexes was determined by drying them, and the salt content was measured using a conductivity meter calibrated against known KBr standards. The polymer weight fraction was then calculated by noting that the percentages must add to 100. The results are shown in FIG. 3.

Membrane Construction & Performance Test:

The viscous coacervate was cast onto a polished aluminum 6061 plate using a roller. The thickness of the as-cast film was ~100 microns. The film was then immersed into a bath of deionized water to extract the salt from the film, and thus causing pore formation. After immersion in the deionized water for 30 min, the porous film was then transferred into a bath of pH 13 water, which partially dissolved the underlying substrate and released the membrane.

Representative SEM images of cross-sections of two membranes are shown in FIG. 4A (formed from the PE coacervate mixture at point Y in FIG. 3) and FIG. 4B (formed from the PE coacervate mixture at point X in FIG. 3).

Figure 7:
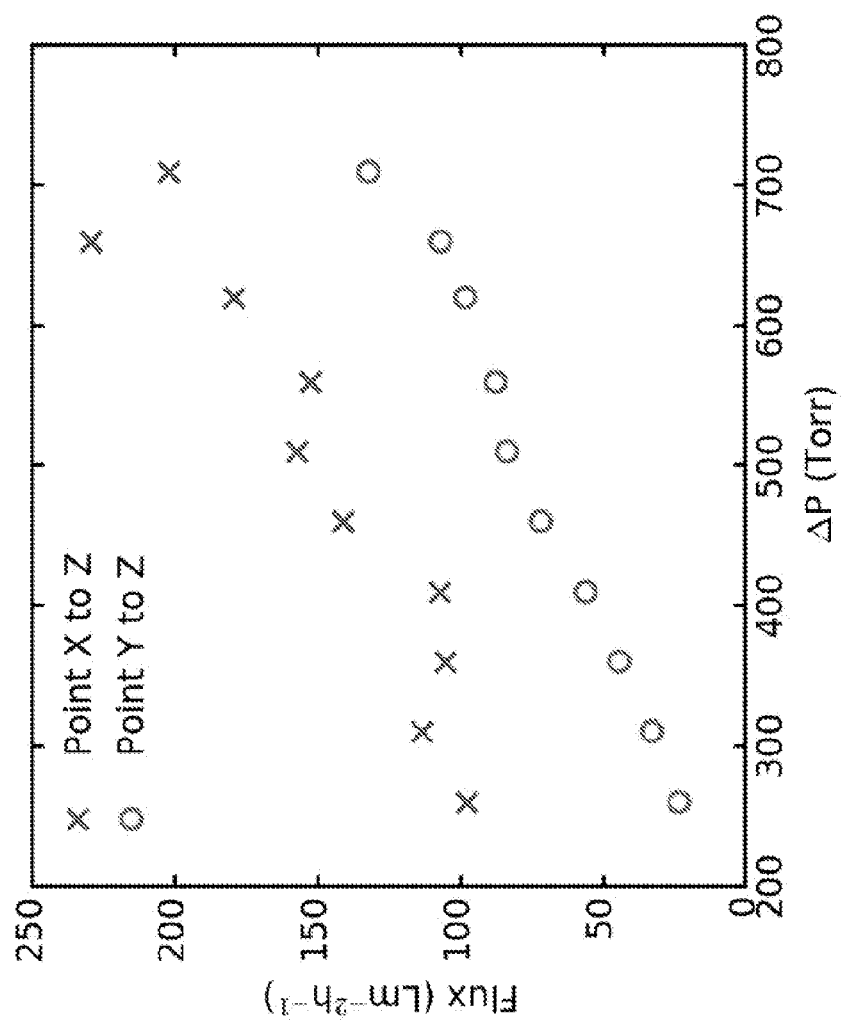
FIG. 7 shows water flux through the porous PEC films of FIGS. 4A (circles) and 4B (x).

The free-standing membrane of FIG. 4B was then tested for performance in terms of its ability to reject polystyrene beads and polyethylene glycol under a pressure gradient. A vacuum pump was used to apply pressure differences of up to one atmosphere across the membrane. UV-vis spectroscopy was used to determine the polystyrene rejection, and thermogravimetric analysis was used to calculate the polyethylene glycol rejection. The results of the polystyrene bead rejection test are shown in FIG. 5. The results of the polyethylene glycol rejection test are shown in FIG. 6. FIG. 7 also demonstrates water flux through the membranes of FIG. 4A (circles) and FIG. 4B (x).

Figure 8:
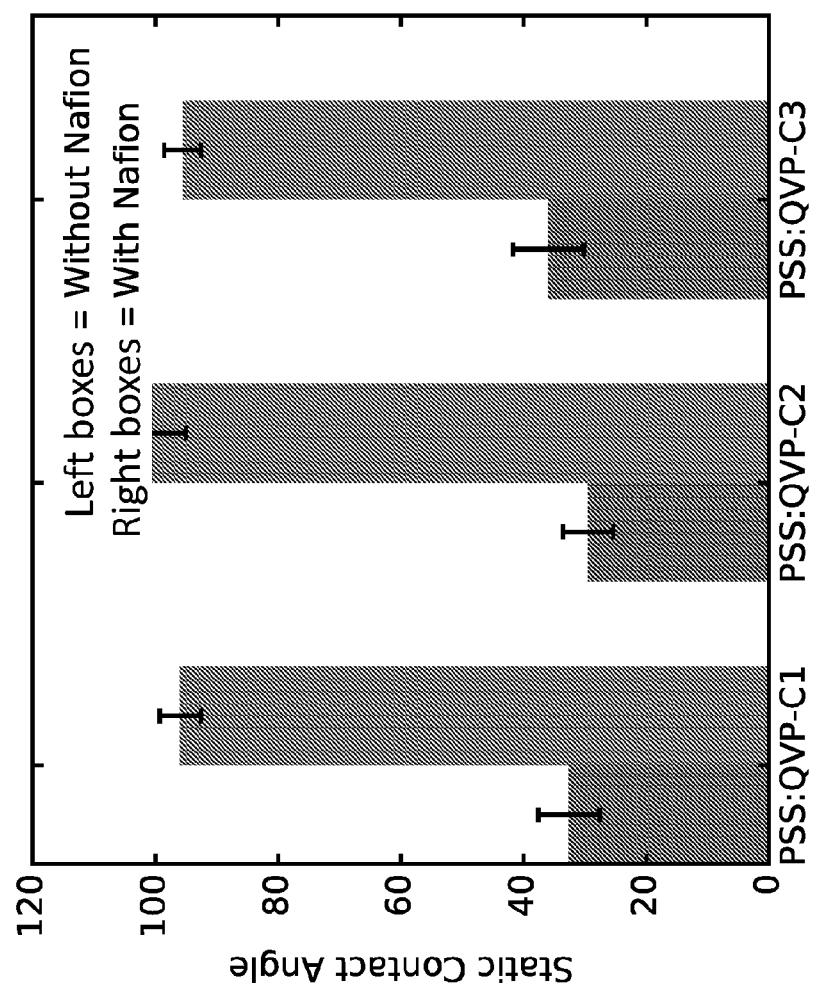
FIG. 8 shows the static contact angle measured after forming a monolayer of Nafion on three different porous PEC films.

Membrane Functionalization:

A monolayer of hydrophobic Nafion was formed on PSS:QVP-C1, PSS:QVP-C2, and PSS:QVP-C3, in order to increase the static contact angle. The results are shown in FIG. 8.

Polyelectrolyte Complex Mechanical Tests:

Mechanical performance of PECs were conducted using a quartz crystal microbalance. A custom quartz crystal microbalance (QCM, AWSensors, Valencia, Spain) was used in conjunction with a N2PK impedance analyzer (Thornhill, Canada) for swelling and viscoelastic measurements of spin coated polyelectrolyte complex films. 1.5 μm polyelectrolyte complex films were directly spin-coated onto 1" quartz crystals with Au electrodes (Inficon, East Syracuse, N.Y.) from the polymer rich coacervate phase. The mechanical tests provided the swelling response and the corresponding shear modulus as a function of the solution ionic strength. The results are shown in FIGS. 9A-9C.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Unless otherwise indicated, the term "about" refers to a variation of no more than ±10% about the recited numeric value.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for making a porous polyelectrolyte complex (PEC) film having a predetermined porosity, the method comprising:

coating the surface of a substrate with a polyelectrolyte (PE) coacervate mixture, the PE coacervate mixture comprising a cationic polymer, an anionic polymer, water, and a salt, the PE coacervate mixture having a salt concentration;

exposing the coating to an aqueous medium having another salt concentration, for a time to remove sufficient salt from the coating to induce solidification of polyelectrolyte complexes (PECs) in the form of a PEC film having pores distributed throughout, wherein the pores have an average diameter in the range of from about 300 nm to about 3 μm, wherein a difference $\Delta_{C-M}$ between the salt concentration of the PE coacervate mixture and the salt concentration of the aqueous medium is selected to achieve a predetermined porosity for the porous PEC film.

2. The method of claim 1, determining the difference $\Delta_{C-M}$ from a calibration plot of $\Delta_{C-M}$ versus porosity.

3. The method of claim 1, wherein the time of exposure to the aqueous medium is at least 30 minutes.

4. The method of claim 1, wherein the coating step is carried out using blade casting or roll casting.

5. The method of claim 1, further comprising removing water from the porous PEC film.

6. The method of claim 5, wherein the water removal is carried out via an air gun.

7. The method of claim 1, further comprising exposing the porous PEC film to an aqueous salt solution having an ionic strength sufficient to dissolve the PECs.

8. The method of claim 7, further comprising regenerating the porous PEC film from the dissolved PECs.

9. The method of claim 1, wherein the cationic polymer is selected from a group consisting of poly(allylamine), poly(ethyleneimine), Chitosan, poly(N-alkyl 4-vinyl pyridinium), poly(N-alkyl 2-vinyl pyridinium), poly(diallyldimethylammonium), poly([2-(Acryloyloxy)ethyl]trimethylammonium), Poly(N,N-dimethyl-3,5-dimethylene piperidinium chloride), poly(vinylbenzyltrimethylammonium chloride), polyvinylamine and combinations thereof, and the anionic polymer is selected from poly(acrylic acid), poly(methacrylic) acid, Agar, Alginate, Hyaluronic Acid, poly(styrene sulfonate), poly(phosphate) poly(vinylsulfonic acid), poly(acrylamido-2-methylpropanesulfonate), and combinations thereof.

10. The method of claim 9, wherein the salt is selected from a group consisting of potassium bromide, sodium chloride, potassium chloride, sodium bromide, sodium thiocyanate, guanidinium bromide, guanidinium thiocyanate, and combinations thereof.

11. The method of claim 1, wherein the predetermined porosity is in the range of from 10% to 90%.

12. The method of claim 11, wherein the predetermined porosity is in the range of from 10% to 60%.

13. The method of claim 1, wherein the pores comprise interconnected pores and closed pores.

14. The method of claim 13, wherein the interconnected pores are in the form of elongated, tortuous channels extending in three-dimensions.

15. A method for making a porous polyelectrolyte complex (PEC) film having a predetermined porosity, the method comprising:
coating the surface of a substrate with a polyelectrolyte (PE) coacervate mixture, the PE coacervate mixture comprising a cationic polymer, an anionic polymer, water, and a salt, the PE coacervate mixture having a salt concentration;
exposing the coating to an aqueous medium having another salt concentration, for a time to induce solidification of polyelectrolyte complexes (PECs) in the form of a PEC film having pores distributed throughout,
wherein a difference $\Delta_{C-M}$ between the salt concentration of the PE coacervate mixture and the salt concentration of the aqueous medium is selected to achieve a predetermined porosity for the porous PEC film, wherein the porous PEC film is composed of a first sublayer and a second sublayer overlying the first sublayer and at the surface of the porous PEC film, wherein the first and second sublayers are characterized by different average pore diameters.

16. The method of claim 15, wherein the average pore diameter of the second sublayer is smaller than the average pore diameter of the first sublayer.

17. A method for making a porous polyelectrolyte complex (PEC) film having a predetermined porosity, the method comprising:
coating the surface of a substrate with a polyelectrolyte (PE) coacervate mixture, the PE coacervate mixture comprising a cationic polymer, an anionic polymer, water, and a salt, the PE coacervate mixture having a salt concentration;
exposing the coating to an aqueous medium having another salt concentration, for a time to induce solidification of polyelectrolyte complexes (PECs) in the form of a PEC film having pores distributed throughout,
wherein a difference $\Delta_{C-M}$ between the salt concentration of the PE coacervate mixture and the salt concentration of the aqueous medium is selected to achieve a predetermined porosity for the porous PEC film, wherein the PE coacervate mixture further comprises a foaming agent and the method further comprises inducing the foaming agent to undergo a reaction to release a gas, thereby generating bubbles throughout the PE coacervate mixture, prior to the exposing step.

18. The method of claim 1, wherein the porous PEC film is characterized as having the ability to reject at least 90% of polystyrene beads having a diameter of at least 100 nm.

19. The method of claim 1, wherein the porous PEC film characterized as having the ability to reject at least 90% of PEGs having a molecular weight of at least $10^4$ g/mol.

* * * * *